United States Patent Office 2,799,699
Patented July 16, 1957

2,799,699

(2'-HYDROXY-3'-OXO-1'-CYCLOHEXENYL)-ALKOXYNAPHTHALENES, ESTERS THEREOF AND THEIR PRODUCTION

Douglas S. Smith, Glenview, Ill., assignor, by mesne assignments, to G. D. Searle & Co., Skokie, Ill., a corporation of Delaware No Drawing. Application August 24, 1954,
Serial No. 451,950

9 Claims. (Cl. 260—488)

My present invention relates to a new group of naphthalene derivatives and, more particularly, to (2' - hydroxy - 3' - oxo - 1' - cyclohexenyl) - alkoxynaphthalenes and esters thereof.

These compounds can be represented by the general structural formula

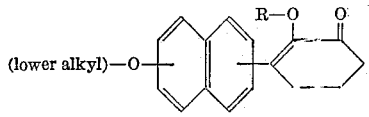

wherein R is a hydrogen or a lower alkylcarbonyl radical.

In the foregoing structural formula the radical R can represent hydrogen or a lower alkylcarbonyl radical such as acetyl, propionyl, butyryl, valeryl, and caproyl. The lower alkyl group can be a methyl, ethyl, straight-chained and branched propyl, butyl, amyl, and hexyl.

The compounds of my invention are conveniently prepared from dihydroxycyclohexenones as exemplified by the following reaction sequence in which dihydropyrogallol is used as a starting material. This dihydroxycyclohexenone is treated with two equivalents of a lower alkylcarbonyl halide to yield the 2,3-diacyloxy-2-cyclohexen-1-one which is then treated under Grignard conditions with an alkoxynaphthyl magnesium halide of the type

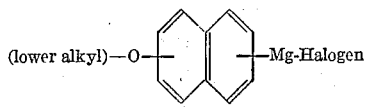

and the resulting condensation product is treated with aqueous ammonium chloride.

The compounds of my invention are valuable as medicinal agents. The esters wherein R is a lower alkylcarbonyl radical are active in antagonizing inflammatory conditions such as iritis. The 2'-hydroxy compounds (wherein R in the first structure above is hydrogen) are also valuable medicinal agents which possess anabolic and antihypertensive properties.

My invention will appear in further detail from the following examples which are set forth for the purpose of illustration only and are not to be construed as limiting the invention in spirit or in scope. In these examples quantities of materials are indicated in parts by weight and vacuum distillation pressures in millimeters of mercury. The infrared spectra are determined in a potassium bromide disk.

Example 1

To a solution of 163 parts of dihydropyrogallol in 2700 parts of benzene and 232 parts of pyridine are added portion-wise 236 parts of acetyl chloride in the course of 1 hour. The mixture is then stirred for 5 hours and the precipitate removed by filtration. The filtrate is washed with cold water, filtered through sodium sulfate and freed from solvents by vacuum distillation at room temperature. The residue is distilled at 1.5 mm. pressure and the 2,3-diacetoxy-2-cyclohexen-1-one is collected at about 130–140° C.

Example 2

To a gently refluxing ether solution of ethyl magnesium bromide (prepared from 14.3 parts of bromoethane, 48.6 parts of magnesium and 350 parts of anhydrous ether) there is added under a nitrogen atmosphere with stirring a solution of 450 parts of 2-bromo-6-methoxynaphthalene in 2100 parts of dry ether and 2700 parts of dry benzene in the course of 2 hours. Refluxing is continued for 115 hours, after which the solution is cooled and filtered through glass wool. The filtrate is added in the course of 2 hours to an ice cold solution of 189 parts of 2,3-diacetoxy-2-cyclohexen-1-one in 1400 parts of dry ether. The resulting green complex is stirred for an hour at 0–5° C. and then treated by cautious addition with 6000 parts of saturated aqueous ammonium chloride solution. The organic layer is separated, washed with saturated ammonium chloride solution and then with water, filtered through anhydrous sodium sulfate and freed from solvents by vacuum distillation at room temperature. The residue is taken up in benzene and thus applied to a silica gel chromatography column. The column is washed with benzene and increasing concentrations of ethyl acetate solutions in benzene. Elution with a 10% solution of ethyl acetate in benzene and concentration of the eluate yields a crystalline material which, crystallized from ether, melts at about 115–118° C. The infrared absorption spectrum shows maxima of strong intensity at 5.68; 5.96; 6.17; 6.26; 6.76; 7.41; 8.04; 8.25; 8.56; 8.94; 9.69 microns, of intermediate intensity at 7.18; 7.34; 7.63; 7.82; 9.24; 10.9; 11.15; 11.6; 12.05 microns and of weak intensity at 6.89; 7.00; 7.08; 10.25; 10.55; 11.3; 11.85; 12.3; 13.15; 14.05 microns. The ultraviolet absorption spectrum shows maxima at 225, 272 and 323 millimicrons with extinction coefficients of about 44,700, 20,800 and 16,300, respectively. The compound is the 2-(2'-acetoxy-3'-oxo-1'-cyclohexenyl)-6-methoxynaphthalene of the structural formula

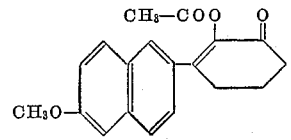

Example 3

A solution of 5 parts of 2-(2'-acetoxy-3'-oxo-1'-cyclohexenyl)-6-methoxynaphthalene in 250 parts of methanol is treated with 5 parts of concentrated hydrochloric acid and heated on a steam bath for 45 minutes. After cooling the precipitate is collected on a filter and recrystallized from ether. The 2-(2'-hydroxy-3'-oxo-1'-cyclohexenyl)-6-methoxynaphthalene thus obtained melts at substantially 173–176° C. The infrared absorption spectrum shows maxima of major intensity at 2.96; 6.04; 6.20; 6.26; 7.29; 7.54; 8.04; 8.34; 8.59; 8.74; 8.85; 9.75; 11.7 microns, of intermediate intensity at 6.78; 6.85; 7.08; 7.65; 7.81; 7.93; 9.24; 11.0; 11.15; 12.1; 13.75 microns, and of minor intensity at 10.35; 10.85; 12.35; 12.95; 13.15; 14.1 microns. The ultraviolet absorption spectrum in methanol shows maxima at 229, 284 and 339 millimicrons with molecular extinction coefficients of 33,500, 12,900, and 21,300, respectively. The ultraviolet absorption spectrum of an 0.1% alcoholic potassium hydroxide solution of this compound shows maxima at 241, 285 and 370 millimicrons with molecular extinction coefficients of 31,900, 5,630 and 16,000 respectively.

Example 4

To a solution of 326 parts of dihydropyrogallol in 5500 parts of benzene and 475 parts of pyridine are added dropwise 642 parts of butyryl chloride in the course of 90 minutes. The mixture is stirred for 8 hours and filtered. The precipitate is washed with ether and the combined filtrates are washes briefly with cold water, dried over anhydrous calcium sulfate, filtered and evaporated under vacuum at room temperature and the residue is vacuum distilled at about 1 mm. pressure.

To an ether solution of ethyl magnesium bromide prepared from 29 parts of bromoethane, 97.2 parts of magnesium and 700 parts of ether there is added under a nitrogen atmosphere with stirring at gentle reflux temperature a solution of 90 parts of freshly distilled 1-bromo-5-methoxynaphthalene in 4500 parts of dry ether and 5500 parts of dry benzene in the course of 100 minutes. Refluxing is continued for 100 hours, after which the solution is cooled, filtered through glass wool by nitrogen pressure and then added in the course of 2 hours to an ice cold solution of 485 parts of the distilled dibutyryl derivative of dihydropyrogallol in 400 parts of ether. Stirring is continued for an additional hour, after which 1200 parts of a saturated aqueous ammonium chloride solution is added gradually. The organic layer is separated, washed with ammonium chloride solution and with water, dried over anhydrous calcium sulfate, filtered and freed from solvent under vacuum at room temperature. The residue is taken up in benzene and applied to a chromatography column containing 4000 parts of silica gel. The column is washed with benzene and then with solutions of ethyl acetate in benzene containing an increasing percentage of ethyl acetate. Elution with an 8% solution of ethyl acetate in benzene and concentration of the eluate yields the 1-(2'-butyroxy-3'-oxo-1'-cyclohexenyl)-5-methoxynaphthalene. The infrared absorption spectrum shows maxima at 5.69 and 5.96 microns. The ultraviolet absorption spectrum shows maxima at 225, 272 and 323 millimicrons.

*Example 5*

To a gently refluxing, stirred solution of ethyl magnesium bromide (prepared from 1.43 parts of bromoethane, 4.9 parts of magnesium and 35 parts of ether) there is added under a nitrogen atmosphere in the course of 2 hours a solution of 55.5 parts of 1-bromo-2-amyloxynaphthalene in 300 parts of ether and 300 of benzene. Refluxing is continued for 5 days after which the solution is cooled, filtered through a glass wool plug and then added in the course of 2 hours to an ice-cold solution of 18.9 parts of 2,3-diacetoxy-2-cyclohexen-1-one in 140 parts of dry ether. Stirring is continued for an hour at 0–5° C., after which the mixture is treated with saturated aqueous ammonium chloride solution. The organic layer is separated, washed with ammonium chloride solution and water, dried over anhydrous calcium sulfate, filtered and freed from solvent by vacuum distillation at 20° C. The residue is dissolved in benzene and applied to a chromatography column containing 200 parts of silica gel. After washing with benzene and 2% ethyl acetate in benzene the column is eluted with 5–10% ethyl acetate in benzene. Evaporation of the solvent from the eluate yields 1 - (2'-acetoxy-3'-oxo-1'-cyclohexenyl)-2-amyloxynaphthalene. The infrared absorption spectrum shows maxima at 5.68 and 5.97 microns and the ultraviolet spectrum shows maxima at 225, 272 and 323 millimicrons.

I claim:

1. A compound of the structural formula

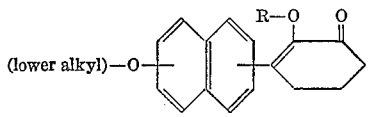

wherein R is a member of the class consisting of hydrogen and lower alkylcarbonyl radicals.

2. A compound of the structural formula

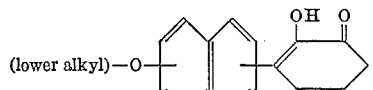

3. 2-(2'-hydroxy-3'-oxo-1'-cyclohexenyl)-6 - methoxynaphthalene.

4. A compound of the structural formula

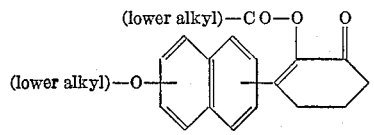

5. A compound of the structural formula

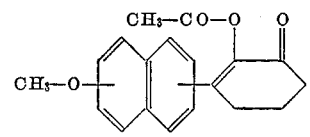

6. 2-(2'-acetoxy-3'-oxo-1'-cyclohexenyl)-6 - methoxynaphthalene.

7. The process of preparing a compound of the structural formula

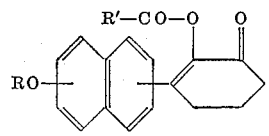

wherein R and R' are lower alkyl radicals, which comprises treatment under Grignard conditions of a compound of the structural formula

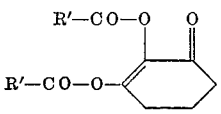

with an alkoxynaphthyl magnesium halide of the structural formula

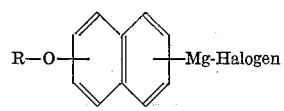

8. The process of preparing a compound of the structural formula

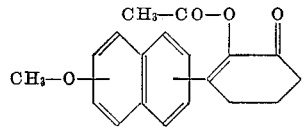

which comprises treatment under Grignard conditions of 2,3-diacetoxy-2-cyclohexen-1-one with a methoxynaphthyl magnesium halide.

9. The process of preparing 2-(2'-acetoxy-3'-oxo-1'-cyclohexenyl) - 6 - methoxynaphthalene which comprises treatment under Grignard conditions of 2,3-diacetoxy-2-cyclohexen-1-one with a 6-methoxy-2-naphthyl magnesium halide followed by addition to the reaction mixture of an aqueous solution of an ammonium halide.

References Cited in the file of this patent

UNITED STATES PATENTS 2,687,436  Novello _____ Aug. 24, 1954

FOREIGN PATENTS 514,592  Great Britain _____ Nov. 13, 1939

OTHER REFERENCES

Szmuszkovicz et al.: J. Am. Chem. Soc. 72 (1950), pp. 566–70.